United States Patent
Lichtenstein et al.

(10) Patent No.: US 12,255,900 B2
(45) Date of Patent: *Mar. 18, 2025

(54) SYSTEM AND METHOD FOR DETECTING LATERAL MOVEMENT USING CLOUD ACCESS KEYS

(71) Applicant: Wiz, Inc., New York, NY (US)

(72) Inventors: Avi Tal Lichtenstein, Tel Aviv (IL); Ami Luttwak, Binyamina (IL); Daniel Hershko Shemesh, Givat-Shmuel (IL)

(73) Assignee: Wiz, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/474,974

(22) Filed: Sep. 26, 2023

(65) Prior Publication Data

US 2024/0031376 A1 Jan. 25, 2024

Related U.S. Application Data

(63) Continuation of application No. 17/657,494, filed on Mar. 31, 2022, now Pat. No. 11,811,787.

(60) Provisional application No. 63/170,125, filed on Apr. 2, 2021.

(51) Int. Cl.
*H04L 9/40* (2022.01)

(52) U.S. Cl.
CPC ................................ *H04L 63/14* (2013.01)

(58) Field of Classification Search
None
See application file for complete search history.

(56) References Cited

U.S. PATENT DOCUMENTS

| | | | | |
|---|---|---|---|---|
| 8,595,822 | B2 * | 11/2013 | Schrecker | H04L 63/1433 726/14 |
| 9,825,978 | B2 * | 11/2017 | Siva Kumar | H04L 63/083 |
| 10,397,185 | B1 * | 8/2019 | Sandholm | H04L 63/102 |
| 10,476,898 | B2 * | 11/2019 | Muddu | G06F 16/444 |
| 10,630,715 | B1 | 4/2020 | Ghosh et al. | |
| 11,184,392 | B2 * | 11/2021 | Thomas | H04L 63/1425 |
| 11,258,590 | B1 * | 2/2022 | Tsarfati | H04L 9/0825 |
| 11,606,378 | B1 * | 3/2023 | Delpont | H04L 63/1433 |
| 11,799,874 | B1 | 10/2023 | Lichtenstein et al. | |
| 11,916,926 | B1 | 2/2024 | Lichtenstein et al. | |
| 12,095,786 | B1 | 9/2024 | Arbel et al. | |
| 12,095,807 | B1 | 9/2024 | Arbel et al. | |
| 2014/0059541 | A1 * | 2/2014 | Heninger | G06F 9/45545 718/1 |
| 2014/0075013 | A1 * | 3/2014 | Agrawal | G06F 11/3409 709/224 |
| 2014/0089658 | A1 * | 3/2014 | Raghuram | G06F 9/45533 380/278 |

(Continued)

*Primary Examiner* — Kaveh Abrishamkar
(74) *Attorney, Agent, or Firm* — M&B IP Analysts, LLC

(57) ABSTRACT

A system and method for detecting potential lateral movement using cloud keys in a cloud computing environment includes determining a first node in a security graph is a compromised node, wherein the security graph represents cloud entities of the cloud computing environment; detecting a cloud key node connected to the first node, wherein the cloud key node represents a cloud key of the cloud computing environment; and generating a potential lateral movement path, including the first node, and a second node, wherein the second node is connected to the cloud key node.

17 Claims, 6 Drawing Sheets

(56) References Cited

U.S. PATENT DOCUMENTS

| | | | |
|---|---|---|---|
| 2015/0121078 A1* | 4/2015 | Fu | H04L 9/3263 |
| | | | 713/175 |
| 2017/0026355 A1* | 1/2017 | Mathaiyan | H04L 63/0428 |
| 2017/0244730 A1* | 8/2017 | Sancheti | H04L 63/205 |
| 2018/0316704 A1* | 11/2018 | Durairaj | H04L 41/142 |
| 2018/0367548 A1* | 12/2018 | Stokes, III | H04L 63/1416 |
| 2019/0297112 A1* | 9/2019 | Yu | H04L 63/18 |
| 2020/0099600 A1* | 3/2020 | Kaplan | H04L 45/74 |
| 2020/0177615 A1 | 6/2020 | Grabois et al. | |
| 2020/0177617 A1 | 6/2020 | Hadar et al. | |
| 2020/0267552 A1* | 8/2020 | Lee | H04W 12/068 |
| 2021/0051137 A1* | 2/2021 | Ruiz | H04L 9/0894 |
| 2021/0120026 A1* | 4/2021 | Kondaveeti | H04L 63/0272 |
| 2021/0203684 A1 | 7/2021 | Maor et al. | |
| 2022/0272117 A1* | 8/2022 | Maheve | H04L 63/1416 |
| 2022/0345483 A1* | 10/2022 | Shua | H04L 9/0825 |
| 2023/0011957 A1* | 1/2023 | Panse | H04L 63/1416 |
| 2023/0164164 A1* | 5/2023 | Herzberg | H04L 63/1441 |
| | | | 726/1 |

\* cited by examiner

SYSTEM AND METHOD FOR DETECTING LATERAL MOVEMENT USING CLOUD ACCESS KEYS

CROSS-REFERENCE TO RELATED APPLICATIONS

This application is a continuation of U.S. Non-Provisional patent application Ser. No. 17/657,494 filed Mar. 31, 2022, which itself claims the benefit of U.S. Provisional Application No. 63/170,125 filed on Apr. 2, 2021, all contents of which are hereby incorporated by reference.

TECHNICAL FIELD

The present disclosure relates generally to cybersecurity, and in particular to detecting lateral movement in cloud computing environments.

BACKGROUND

As users migrate data storage, processing, and management tasks to decentralized, off-location devices, platforms, and services, the limitations of such devices, platforms, and services, also referred to as cloud environments, and the like, may impact a user's data operations. Specifically, vulnerabilities within cloud-deployed resources and processes may present unique challenges requiring remediation. Due to the scale and structure of cloud systems, detection of workload vulnerabilities, which detection may be readily-provided in non-cloud deployments, may require numerous, complex tools and operations.

Current solutions to cloud workload vulnerability scanning challenges require the deployment of specialized tools, including scanning agents directed to maintenance of virtual machines (VMs), where operation and maintenance of such tools may be costly, time-consuming, or both. Agent-dependent processes are more complex to deploy and maintain for scanning of containers, such as containers managed using Kubernetes®, and others, like, container-management platforms, and may fail to provide for coverage of serverless applications. Where such agent-implementation processes fail to provide for full cloud workload vulnerability scanning, additional methods, such as snapshot-based scanning, may supplement implemented solutions.

Cloud environments are susceptible to attacks such as lateral movement, in which an attacker attempts to gain access to a resource within the cloud environment, and move through that resource to a next resource in the network. For example, an attacker may gain access through an endpoint of a cloud environment, using a malware attack, then gain access to user credentials which allow the attacker to access the cloud environment, and possibly employ privilege escalation and other attacks. Once initiated, lateral movement is difficult to detect, and the more credentials an attacker is able to discover and possess, the more opportunities the attacker has to infiltrate the cloud environment and achieve their goals. For example, an attacker who gains access to cloud keys, which are access keys, can steal data from a cloud environment, install malware, and perform other actions which are not desirable.

Detection of lateral movement is therefore desirable, as is prevention of such attacks. It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for detecting potential lateral movement using cloud keys in a cloud computing environment. The method comprises: determining a first node in a security graph is a compromised node, wherein the security graph represents cloud entities of the cloud computing environment; detecting a cloud key node connected to the first node, wherein the cloud key node represents a cloud key of the cloud computing environment; and generating a potential lateral movement path, including the first node, and a second node, wherein the second node is connected to the cloud key node.

Certain embodiments disclosed herein also include a non-transitory computer readable medium having stored thereon causing a processing circuitry to execute a process, the process comprising: determining a first node in a security graph is a compromised node, wherein the security graph represents cloud entities of the cloud computing environment; detecting a cloud key node connected to the first node, wherein the cloud key node represents a cloud key of the cloud computing environment; and generating a potential lateral movement path, including the first node, and a second node, wherein the second node is connected to the cloud key node.

Certain embodiments disclosed herein also include a system for detecting potential lateral movement using cloud keys in a cloud computing environment. The system comprises: a processing circuitry; and a memory, the memory containing instructions that, when executed by the processing circuitry, configure the system to: determine a first node in a security graph is a compromised node, wherein the security graph represents cloud entities of the cloud computing environment; detect a cloud key node connected to the first node, wherein the cloud key node represents a cloud key of the cloud computing environment; and generate a potential lateral movement path, including the first node, and a second node, wherein the second node is connected to the cloud key node.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
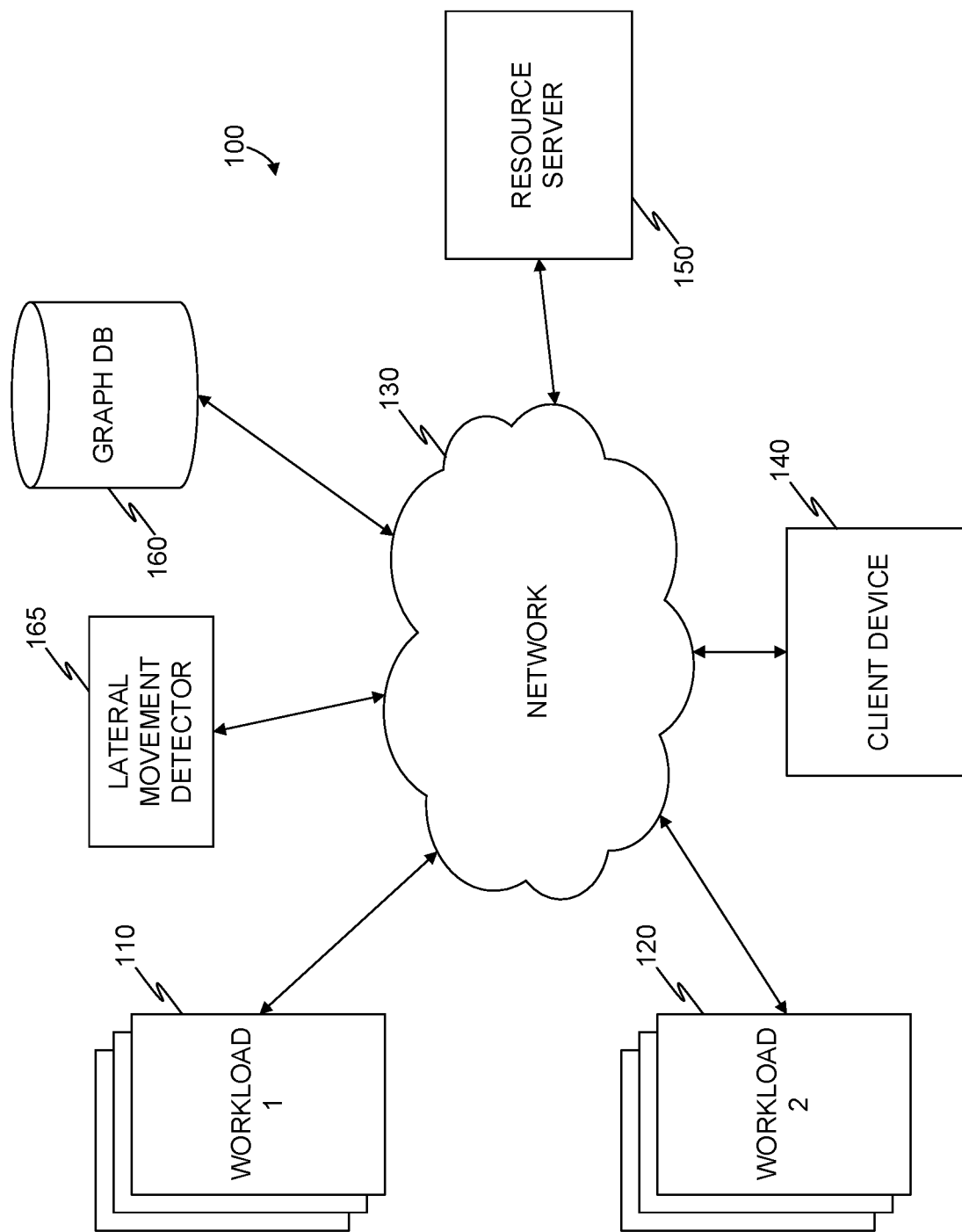
FIG. 1 is a schematic illustration of a cloud computing environment utilized to describe the various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for detecting potential lateral movement using cloud keys in a cloud computing environment. The method and system further include determining that a first node in a security graph is a compromised node, wherein the security graph represents cloud entities of the cloud computing environment; detecting a cloud key node connected to the first node, wherein the cloud key node represents a cloud key of the cloud computing environment; and generating a potential lateral movement path, including the first node, and a second node, wherein the second node is connected to the cloud key node.

Workloads such as virtual machines and containers are scanned for cloud keys, which are matched to a cloud identity. A cloud identity may be a user account or role. The cloud identities and cloud keys are loaded in a graph database, which can be queried to determine risks.

FIG. 1 is an example of a schematic illustration of a cloud computing environment 100 utilized to describe the various embodiments. The cloud computing environment 100 includes a network 130. In an embodiment, the network 130 may be configured to provide connectivity of various sorts, as may be necessary, including but not limited to, wired and/or wireless connectivity, including, for example, local area network (LAN), wide area network (WAN), metro area network (MAN), worldwide web (WWW), Internet, and any combination thereof, as well as cellular connectivity. The cloud computing environment 100 may be implemented for example as a virtual private cloud (VPC). In an embodiment, the cloud computing environment 100 is deployed on a cloud infrastructure. A cloud infrastructure may be, for example, Amazon® Web Services (AWS), Google® Cloud Platform (GCP), Microsoft® Azure, and the like.

The network 130 provides connectivity for multiple workload types, such as a plurality of first workloads 110, and a plurality of second workloads 120. A workload 120 may be a specific application, service, web server, container, virtual machine, serverless function, and the like. A virtual machine may be implemented, for example, as an Oracle® VirtualBox. A container may be implemented using a container engine, such as Docker® or Kubernetes®. A serverless function may be, for example, Amazon® Lambda. The network 130 may also provide connectivity for a client device 140 and a resource server 150. The client device 140 and/or the resource server 150 may be implemented as machines which are part of the cloud computing environment 100, or as external devices to the cloud computing environment 100. In an embodiment, a client device 140 which is external to the cloud computing environment 100 may request access to a service for example provided by a workload of the first plurality of workloads 110.

In some embodiments, the first plurality of workloads 110 may be workloads of a first type (e.g., virtual machines) while the second plurality of workloads 120 may be workloads of a second type (e.g., containers). An attacker may gain access to a workload of a second type from a workload of a first type, for example by finding certificates, credentials, cloud keys, passwords, and the like, which can be exploited to gain access to a workload of a first type. For example, if a container is allowed to communicate with a VM, an attacker may use credentials stored in, or accessible by, the container, to attack (i.e., gain access to) the VM.

Resource cloud entities, such as workloads, clients, servers, and principal cloud entities, such as user accounts, services accounts, and roles, may need to perform operations on other resources or modify configuration of the cloud computing environment utilizing certain software, such as application programming interfaces (APIs), orchestrators, and the like. In order to manage the permissions, authorizations, and to enact policies, cloud computing environments include cloud keys for performing authentication, authorization, and the like. In an embodiment, a cloud key is implemented into a text file, such as a configuration file, a structured configuration file (e.g., JSON, YAML, XML, and the like), a script, a source code, and the like. A cloud key may be, for example, an Amazon® Web Services (AWS), IAM (identity and access management) key, a Google® Cloud Platform (GCP) service account key, a GCP OAuth® refresh token, a GCP access token, a Microsoft® Azure service principal key, an Azure OAuth® refresh token, an Azure access token, and the like.

In certain embodiments, a workload contains a cloud access key of a user (e.g., user account) who is using or has used the workload to perform an operation in the cloud computing environment. A cloud key is a long term credential, meaning that the credential either does not expire, or it expires after a long period of time. This is opposed to a short term credential, such as a token generated by an RSA SecurID®, which generates a token for two factor authorization at fixed short time intervals.

The cloud computing environment 100 further includes a lateral movement detector 165, and a graph database 160, on which a security graph is stored. In certain embodiments, the lateral movement detector 165 and the graph database 160 are implemented in an inspecting cloud environment, which is different from the cloud computing environment 100. For example, the inspecting cloud environment may be deployed as a first VPC using a first cloud infrastructure, while the cloud computing environment 100 may be deployed as a second VPC on a second cloud infrastructure, which is different from the first cloud infrastructure.

In an embodiment, the graph database 160 may be configured to provide one or more functionalities including, without limitation, storing data received from various inspector workloads, and data layers, such as, for example, identity data, network data, image inspection data, code data, and the like, to create one or more interconnected graphs representing a cloud environment, such as the cloud computing environment 100. The graph database 160 may be configured to store only environment metadata. Environment metadata may be based on workloads, user accounts, service accounts and the like. The graph database 160 may be further configured to not store sensitive data. In certain embodiments the security graph is generated based on a predefined data template (i.e., data schema). For example, resources may have a first data type in the data schema, while principals have another data type, which is different from the first data type. A resource may be, for example, a virtual machine, a container, a serverless function, and application, and the like. A principal is a cloud entity that acts on a resource. In an embodiment, a principal may be, for example, a user account, a service account, a role, and the like. The security graph stored in the graph database 160 is discussed in more detail below.

The lateral movement detector 165 is configured to detect lateral movement, and lateral movement impact based on compromised cloud keys. For example, a compromised cloud key may lead to privilege escalation, allowing an attacker to gain high privileges within the cloud computing environment 100 (also known as a tenant of a cloud infrastructure). In an embodiment, the lateral movement detector 165 may inspect a workload to detect therein a cloud key. Inspecting a workload may include, for example, generating a snapshot of a disk associated with the workload, generating a volume based on the snapshot, for example, in an inspection cloud environment, associating the generated volume with a cloud key inspector, and inspecting the generated volume for a cloud key.

In some embodiments, a workload may be implemented as a container engine, for example as a Kubernetes® object (e.g., container, node, etc.). An API server of the container engine, such as the Kubernetes® API Server, may be queried, for example, to detect a cloud key associated with a node.

In certain embodiments, an inspector, or a lateral movement detector 165, may store a cloud key in a security graph, for example, by configuring the security graph database 160 to generate a node in the security graph representing the cloud key (i.e., cloud key node). The cloud key node may be connected to a node representing the workload on which it was detected through inspection.

Figure 2:
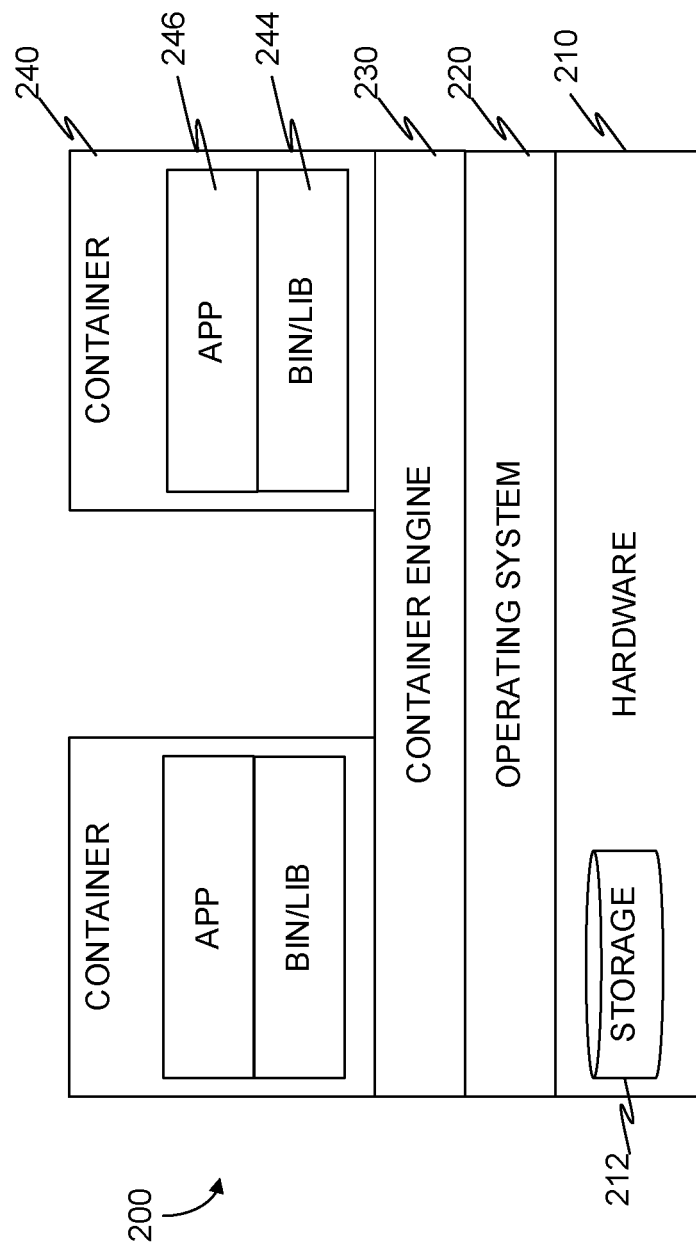
FIG. 2 is a schematic illustration of a container engine, implemented in accordance with an embodiment.

FIG. 2 is an example of a schematic illustration 200 of a container engine, implemented in accordance with an embodiment. A container engine requires a hardware layer 210, which includes physical devices such as storage devices, memory devices, processors, network interface cards, and the like. Storage device 212 is an example of such a physical device.

An operating system (OS) 220 runs on top of the hardware layer 210. The OS layer supports a container engine 230. A container engine may be, for example, Kubernetes®, Docker®, and the like. The container engine 230 may run a plurality of containers, such as container 240. The container engine 230 may provision hardware resources from the hardware layer 210 via the OS layer 220.

A container 240 includes a binaries and libraries 244 on top of which an application, such as application 246, is executed in the container environment. Typically, a single application will run in a single container. Containers rely on a shared OS, while allowing segregation of applications which is considered more secure. A compromised container therefore does not automatically mean a compromised machine (i.e., container engine), however this is not a guarantee.

In certain embodiments, each container (e.g., container 240) is run in a pod, which may include a plurality of containers. In turn, each pod is deployed in a node, which may include a plurality of pods. A plurality of nodes is deployed in a container cluster.

Virtual machines and containers are examples of virtual instances (i.e., workloads) which run in cloud computing environments. One benefit they provide is the ability to provision physical resources in a way which allows multiple different computing environments to utilize the same resources.

Figure 3:
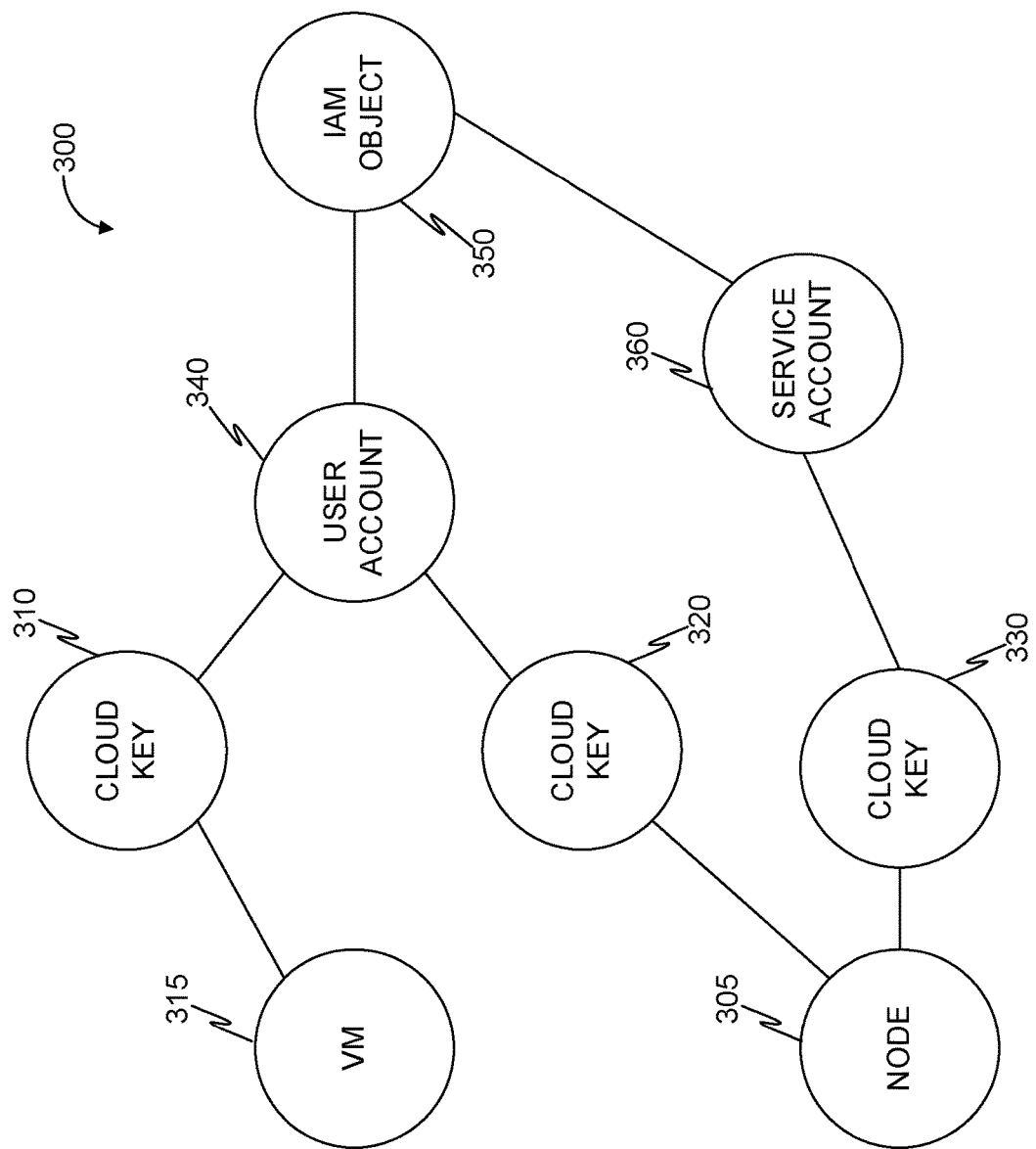
FIG. 3 is a security graph for detection of lateral movement in a cloud computing environment, implemented in accordance with an embodiment.

FIG. 3 is an example of a security graph 300 for detection of lateral movement in a cloud computing environment, implemented in accordance with an embodiment. The security graph 300, which may be stored in a graph database 160, represents a cloud computing environment, such as the cloud computing environment 100 of FIG. 1 above. Representing a cloud computing environment includes storing nodes representing various cloud entities. A node may represent a cloud entity, such as principals and resources. A resource may be, for example, an application, a bucket, a virtual machine, a container, a serverless function, and the like. A principal is a cloud entity which acts on a resource and may be, for example, a user account, a service account, a role, and the like.

The security graph 300 includes a first cloud key node 310 and a second cloud key node 320, each representing a cloud key in the cloud computing environment. A cloud key may be detected, for example, by an inspector or lateral movement detector, such as described above. In an embodiment, a graph database may generate a connection between a node representing a cloud key to a node representing a user account, for example, to indicate that the user account uses the cloud key. In certain embodiments, connecting a cloud key node to a user account node is performed in response to detecting an identifier of the user account represented by the user account node, in the detected cloud key. In other embodiments, a lookup may be performed, for example, by querying an IAM server to determine what user account is associated with a detected cloud key. The first cloud key node 310 and the second cloud key node 320 are connected to a user account node 340, representing a user account.

In an embodiment, a user account may include data, for example, a username, credential identifiers (i.e., identifiers which are used to uniquely identify a credential, such as a cloud key), hash of a key, and the like. Such data may be stored in the security graph 300 and associated with the user account node 340. A third cloud key node 330, representing a third cloud key, is connected to a service account node 360, representing a service account. In an embodiment, a service account is a type of cloud entity representing a principal, which allows a resource, such as a serverless function, to act as a principal in the cloud computing environment. The user account node 340 and service account node 360 are connected to an identity and access management (IAM) object node 350, representing an IAM object. An IAM object may be, for example, a permission, a policy, and the like. In an embodiment, an IAM object node may be generated by querying an IAM server to detect, for example, a policy, and generating the IAM object node in response to detecting the policy. For example, the IAM server may be queried to detect any policy which matches a user account identifier. In certain embodiments, the IAM object node is connected to a user account node, service account node, and the like, in response to determining that the IAM object node represents a policy which corresponds with, for example, the user account represented by the user account node.

In an embodiment a cloud key may provide time limited or permanent access to a resource in a cloud computing environment. In some embodiments a plurality of resources are implemented on a tenant (i.e., cloud computing environment deployed in a cloud infrastructure). By gaining access to a workload of the cloud computing environment which stores cloud keys thereon, an attacker may gain access to other workloads in the same tenant. While the attacker may use a first set of credentials to gain access to the workload or exploit some other vulnerability to gain access to the workload, possession of a cloud access key may allow the attacker to gain unfettered access to other workloads, user accounts, and the like within the tenant, which is both undesirable and may result in a substantial loss for the rightful owner of the tenant.

In an embodiment, the first cloud key may be detected in a storage of a virtual machine, represented by VM node 315, which is connected to the first cloud key node 310. The third cloud key and second cloud key are detected in a container node, which is represented by a container node 305, connected to the third cloud key node 330 and the second cloud key node 320.

By generating a security graph 300 including such nodes and populating it with data based on the cloud computing environment it is possible to detect lateral movement, privilege escalation, and the like. For example, the first cloud key is compromised through a vulnerability of the VM. The security graph 300 may be queried to detect other compromised nodes. The first cloud key node 310 is connected to the user account 340, which further includes the second cloud key 320. The second cloud key allows to access the container node, therefore the container node 305 may be determined to be potentially compromised.

In an embodiment each node may further store metadata and data relating to the object. For example, a cloud key node 320 may include therein a unique account identifier.

Figure 4:
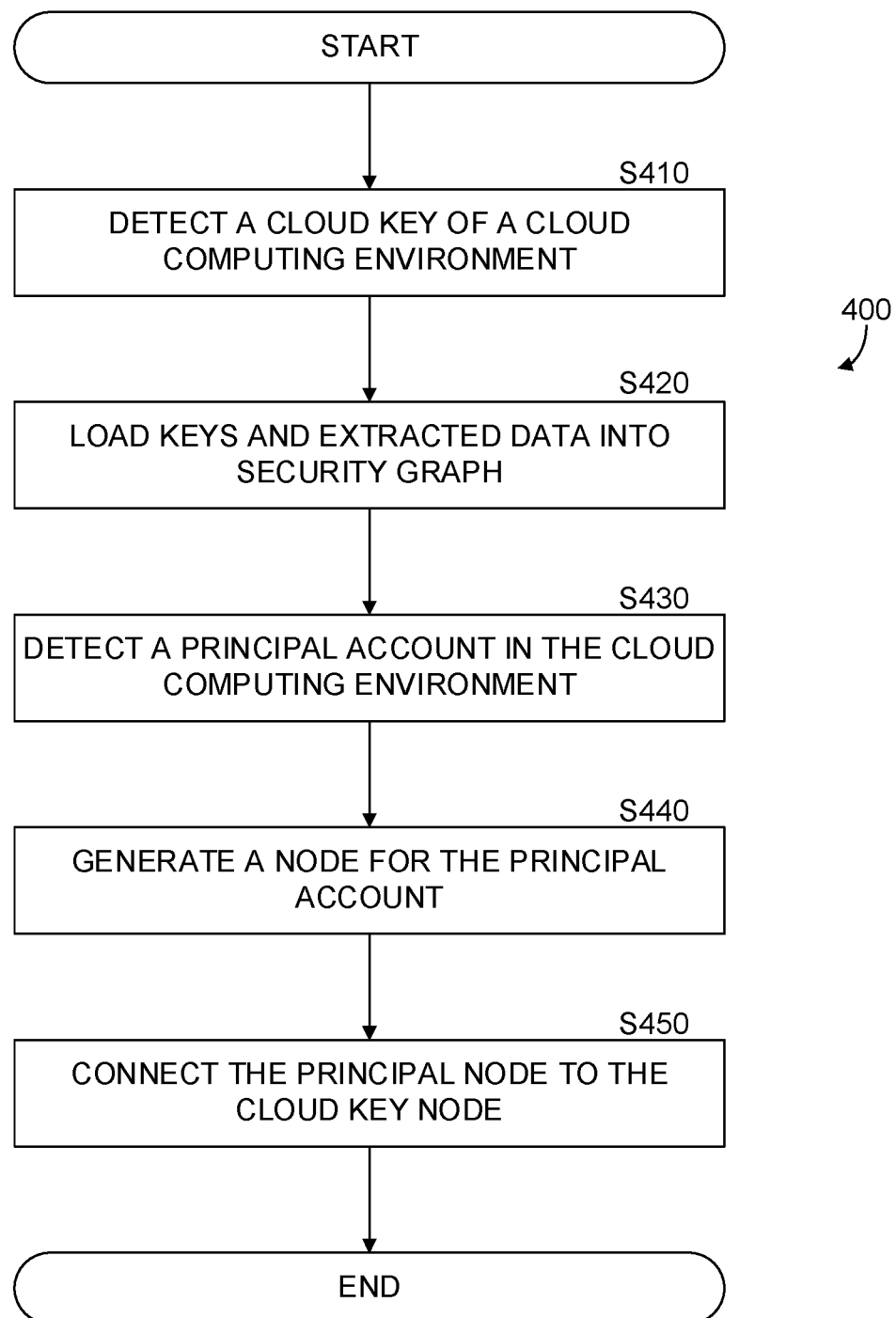
FIG. 4 is a flowchart of a method for populating a security graph for detecting lateral movement, implemented in accordance with an embodiment.

FIG. 4 is a flowchart 400 of a method for populating a security graph for detecting lateral movement, implemented in accordance with an embodiment.

At S410, a cloud key of a cloud computing environment is detected. In an embodiment a workload is inspected to detect the cloud key. In an embodiment, a deep content inspection of a disk image may be implemented. For example, a snapshot may be generated based on a disk of the workload. A volume may be mounted based on the snapshot in a cloud inspection environment, and associated with an inspector for detecting cloud keys.

In some embodiments, a cloud key is embedded into a file type, such as a text configuration file, a structured configuration file (e.g. JSON, YAML, XML, etc.), a script, a source code, and the like. In certain embodiments detecting a cloud key includes querying a container engine. For example, a Kubernetes® API server may be queried to detect cloud keys available thereon. Cloud keys may be, for example, IAM access keys, service account keys, OAuth refresh keys, access tokens, service principal keys and the like. A key may include a secret, or a hash of a secret.

At S420, data extracted from the detected key is stored in a security graph. Extracted data may include a secret, and metadata, such as a particular cryptography algorithm used, version number, bit length, hash, etc. A hash may be used to connect keys, which may be detected on different workloads. In an embodiment the extracted data may be stored in a cloud key node, representing the detected cloud key.

The security graph may be stored on a graph database, such as graph database 160 of FIG. 1. Storing data into the security graph may include generating a node representing a detected cloud key. A cloud key may include information such as a unique user account identifier. Such an identifier may be represented by a node in the security graph and connected to a cloud key node.

At S430, a principal account is detected in the cloud computing environment. In an embodiment, detecting a principal account includes, for example, querying an IAM server of the cloud computing environment, to detect a principal account. A principal account may be, for example, a user account, a service account, a role, and the like.

At S440, principal node is generated in the security graph. In an embodiment, a principal node is generated for each detected principal account. In certain embodiments, the principal node may further include an identifier of the principal account, such as a user name, email address, and the like.

At S450, the principal node is connected to the cloud key node. In an embodiment, connecting nodes may be performed by generating an edge between the principal node and the cloud key node. In an embodiment, a cloud key includes a unique account identifier which can be used to reference an account which corresponds to a principal node. In certain embodiments where a cloud key does not include a unique account identifier, a database lookup may be initiated based on the cloud key secret, or a hash thereof, to determine what unique account identifier is assigned. For example, a database of an IAM server may be queried to detect a user account associated with the cloud key secret.

In some embodiments the cloud computing environment further includes a backend which may be configured to read, from cloud accounts, cloud metadata on a cloud account, including, without limitation, network configurations, IAM configurations, asset inventories, and the like, as well as any combination thereof. Such reading may be limited to control-plane configuration data, with no sensitive data accessed or transmitted. Further, platform backend may be configured to receive metadata and security findings from the account of the client cloud, where such metadata and security findings may include, as examples and without limitation, findings, such as packages and versions, misconfigurations, and the like. Data read in this manner may be further used to populate the risk assessment graph, allowing a connection to be made between resources of the cloud environment (load balancers, API gateways, etc.) to certificates and keys.

Figure 5:
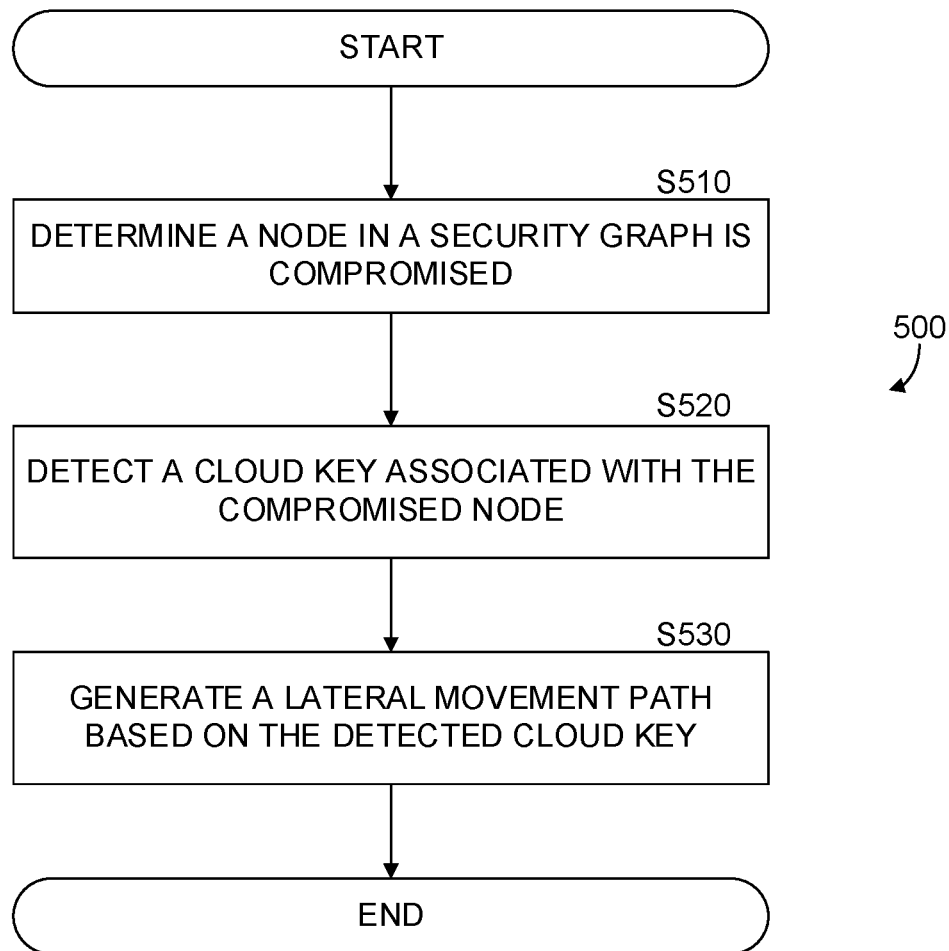
FIG. 5 is a flowchart of a method for detecting lateral movement using cloud keys with a security graph, implemented in accordance with an embodiment.

FIG. 5 is an example flowchart 500 of a method for detecting lateral movement using cloud keys with a security graph, implemented in accordance with an embodiment. In an embodiment, lateral movement detection is performed by a lateral movement detector, for example the lateral movement detector 165 of FIG. 1.

At S510, a compromised node in a security graph is determined. In some embodiments, an input may be received to indicate that a node is compromised. In an embodiment, a compromised node is a node to which unauthorized access has occurred or may occur. In other embodiments a simulation may be generated to determine impact of having a particular node compromised. In such embodiments, a node may include an indicator to indicate that the compromised node is being simulated as compromised, and is not actually compromised.

The compromised node represents a resource or principal which is compromised. In an embodiment the compromised node is a node of the security graph, which is populated, for example, utilizing the method described above. In some embodiments a compromised node represents a cloud key detected on a breached machine. A breached machine is a workload which has an indication of being attacked. In an embodiment, a breached machine may include a container node, a VM, and the like.

At S520, a cloud key is detected which corresponds to the compromised node. In certain embodiments, the compromised node is a node representing a cloud key. In other embodiments the compromised node represents a resource, such as a VM, container, serverless function, and the like. In certain embodiments, the compromised node represents a principal, for example, a user account, a service account, a role, and the like.

In some embodiments, a security graph is queried to detect a cloud key node which is connected via at least one edge to the compromised node. In an embodiment, nodes in the security graph may be connected directly by an edge, or indirectly with an intermediate node. For example, in FIG. 3 above the second cloud key node 320 is connected to a user account node 340 in a direct connection, and connected to the IAM object node 350 indirectly, with the user account 340 serving as an intermediate node.

At S530, a lateral movement path is generated based on the detected key. In certain embodiments, a security graph may be queried to detect another node which is connected to the detected cloud key. The another node is added to the lateral movement path in response to determining that an entity (e.g., an attacker) having access to the cloud key of the cloud key node is able to access a resource or principal represented by the another node.

In the example of FIG. 3, the VM represented by VM node 315 may include a vulnerability, such as a missing software path. If an attacker is able to access the VM, they may gain access to the first cloud key, represented by first cloud key node 310. The first cloud key allows access the user account, represented by user account node 340. Therefore, the user account node 340 is included in the lateral movement path. The second cloud key, represented by the second cloud key node 320, is accessible from the user account, therefore the second cloud key may also be determined as compromised and added to the lateral movement path as well. An attacker having access to the second cloud key may in turn access the container node, represented by the container node 305. In certain embodiments steps S510 and S520 may be performed iteratively, in order to generate a lateral movement path.

In an embodiment, a client device, such as client device 140 may query the graph database to determine an impact of a compromised node. In certain embodiments, a service may receive an indication that a node is compromised, then scan the risk assessment graph to determine other potentially compromised nodes. Services corresponding to potentially compromised nodes may be suspended (temporarily or permanently) from the cloud based computing environment. In certain embodiments, a cloud key may be revoked. For example, a token may be set to expire once it is determined that the token is on a breached machine, or associated with an account having another token on a breached machine.

In some embodiments, a system, such as a client device or server, may continuously scan the graph to determine potentially compromised node. For example, the system may run 'what-if' scenarios by assuming a node of the risk assessment graph is compromised, then determining what other nodes may become compromised as a result. In certain embodiments, nodes which may compromise a plurality of nodes are flagged, for example, by generating a notification identifying such nodes, or adding a metadata flag to the node itself. A threshold may be set, so that nodes which may potentially compromise a number of nodes meeting or exceeding that threshold are flagged. Identifying such nodes may allow an administrator of the cloud computing environment to either ensure that proper strong encryption is in place in communication of such nodes, or alternatively to design a robust network to decrease the effect of the identified node in case of compromise. For example, permissions may be split between two or more principal accounts.

In certain embodiments, when a cloud key is determined to be compromised, and instruction may be generated, which when executed by an IAM server causes the cloud key to expire.

The ability to take such action and quickly determine compromised cloud keys is beneficial as it improves overall security of a system. By minimizing the amount of time an unauthorized party has access to a cloud key, the potential for damage is also reduced.

Figure 6:
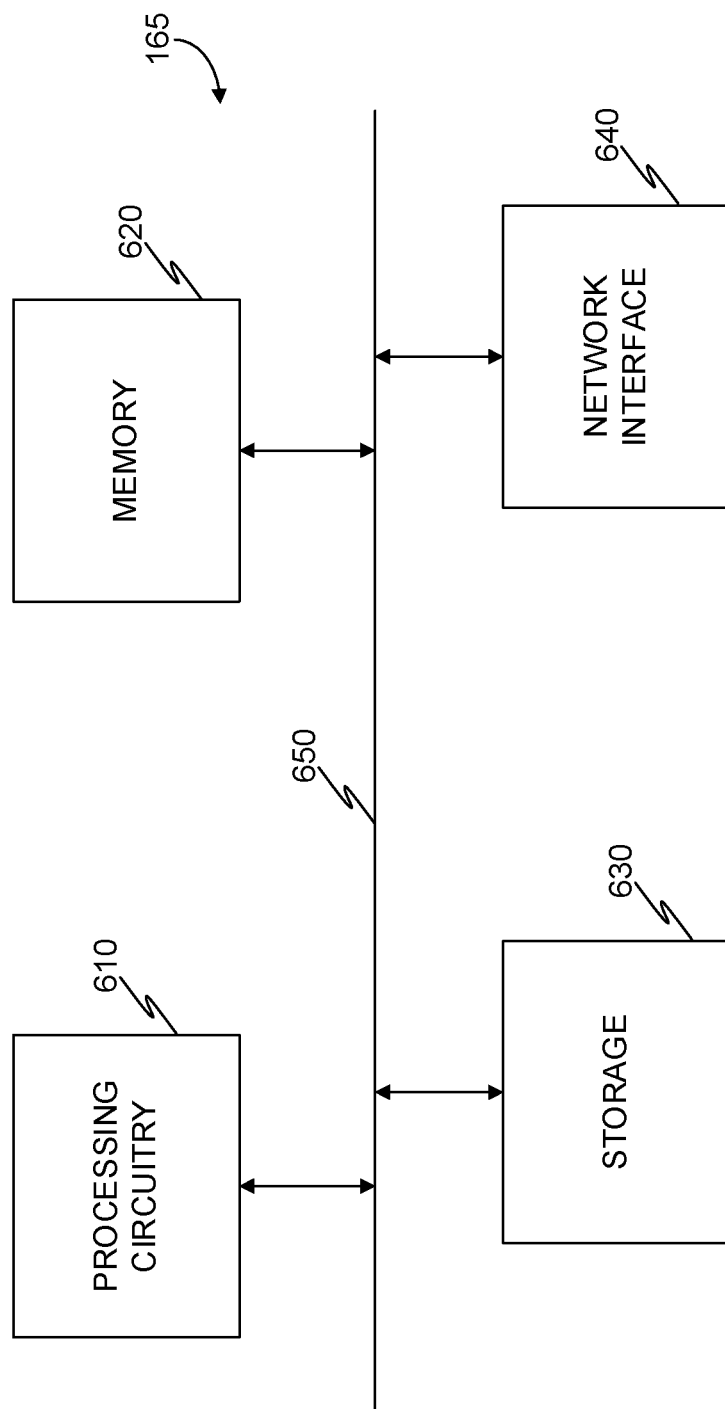
FIG. 6 is a schematic diagram of the lateral movement detector according to an embodiment.

FIG. 6 is an example schematic diagram of the lateral movement detector 165 according to an embodiment. The lateral movement detector 165 includes a processing circuitry 610 coupled to a memory 620, a storage 630, and a network interface 640. In an embodiment, the components of the lateral movement detector 165 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, or any other medium which can be used to store the desired information.

The network interface 640 allows the lateral movement detector 165 to communicate with, for example, the graph database 160.

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether such a computer or processor is explicitly shown or not. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting potential lateral movement in a cloud computing environment, comprising:
   generating in a security database a representation of a cloud computing environment, the cloud computing environment including a plurality of cloud entities;
   determining a first node in the security database is a compromised node wherein the first node represents a first cloud entity of the plurality of cloud entities;
   detecting a credential node connected to the first node, wherein the credential node represents a credential utilized in the cloud computing environment; and
   generating a potential lateral movement path, including the first node, and a second node representing a second cloud entity of the plurality of cloud entities, wherein the second node is connected to the credential node.

2. The method of claim 1, further comprising:
   determining that the first cloud entity is exploited.

3. The method of claim 1, wherein the credential is any one of: a certificate, a cloud key, a password, and a combination thereof.

4. The method of claim 1, wherein the credential is implemented as any one of: a text file, a configuration file, a structured configuration file, a script, a source code, and a combination thereof.

5. The method of claim 1, further comprising:
   determining an expiry of the credential; and
   determining that the potential lateral movement path is not a lateral movement path in response to determining that the credential is expired.

6. The method of claim 1, further comprising:
   inspecting a workload deployed in the cloud computing environment to detect the credential, wherein the workload is represented by the first node.

7. The method of claim 1, further comprising:
   inspecting a plurality of layers of the cloud computing environment for an object.

8. The method of claim 7, wherein the plurality of data layers includes any one of: an identity layer, a network layer, a code layer, and a combination thereof.

9. A non-transitory computer-readable medium storing a set of instructions for detecting potential lateral movement in a cloud computing environment, the set of instructions comprising:
   one or more instructions that, when executed by one or more processors of a device, cause the device to:
   generate in a security database a representation of a cloud computing environment, the cloud computing environment including a plurality of cloud entities;
   determine a first node in the security database is a compromised node wherein the first node represents a first cloud entity of the plurality of cloud entities;
   detect a credential node connected to the first node, wherein the credential node represents a credential utilized in the cloud computing environment; and
   generate a potential lateral movement path, including the first node, and a second node representing a second cloud entity of the plurality of cloud entities, wherein the second node is connected to the credential node.

10. A system for detecting potential lateral movement in a cloud computing environment comprising:
    a processing circuitry; and
    a memory, the memory containing instructions that, when executed by the processing circuitry, configure the system to:
    generate in a security database a representation of a cloud computing environment, the cloud computing environment including a plurality of cloud entities;
    determine a first node in the security database is a compromised node, wherein the first node represents a first cloud entity of the plurality of cloud entities;
    detect a credential node connected to the first node, wherein the credential node represents a credential utilized in the cloud computing environment; and
    generate a potential lateral movement path, including the first node, and a second node representing a second cloud entity of the plurality of cloud entities, wherein the second node is connected to the credential node.

11. The system of claim 10, wherein the memory contains further instructions which when executed by the processing circuitry further configure the system to:
    determine that the first cloud entity is exploited.

12. The system of claim 10, wherein the credential is any one of:
    a certificate, a cloud key, a password, and a combination thereof.

13. The system of claim 10, wherein the credential is implemented as any one of:

a text file, a configuration file, a structured configuration file, a script, a source code, and a combination thereof.

14. The system of claim 10, wherein the memory contains further instructions which when executed by the processing circuitry further configure the system to:
   determine an expiry of the credential; and
   determine that the potential lateral movement path is not a lateral movement path in response to determining that the credential is expired.

15. The system of claim 10, wherein the memory contains further instructions which when executed by the processing circuitry further configure the system to:
   inspect a workload deployed in the cloud computing environment to detect the credential, wherein the workload is represented by the first node.

16. The system of claim 10, wherein the memory contains further instructions which when executed by the processing circuitry further configure the system to:
   inspect a plurality of layers of the cloud computing environment for an object.

17. The system of claim 16, wherein the plurality of layers includes any one of:
   an identity layer, a network layer, a code layer, and a combination thereof.

* * * * *